United States Patent
Barnett et al.

(10) Patent No.: US 7,818,150 B2
(45) Date of Patent: Oct. 19, 2010

(54) METHOD FOR BUILDING ENTERPRISE SCALABILITY MODELS FROM LOAD TEST AND TRACE TEST DATA

(75) Inventors: Paul T. Barnett, Plano, TX (US);
Timothy E. Wise, Austin, TX (US);
Allan Drew Clarke, Austin, TX (US);
Richard Gimarc, Austin, TX (US);
James Reynolds, Mt. Desert, ME (US)

(73) Assignee: HyPerformix, Inc., Austin, TX (US)

( * ) Notice: Subject to any disclaimer, the term of this patent is extended or adjusted under 35 U.S.C. 154(b) by 582 days.

(21) Appl. No.: 11/374,826

(22) Filed: Mar. 13, 2006

(65) Prior Publication Data
US 2006/0224375 A1   Oct. 5, 2006

(51) Int. Cl.
*G06F 7/48* (2006.01)
(52) U.S. Cl. .......................................... 703/6
(58) Field of Classification Search ............... 703/6
See application file for complete search history.

(56) References Cited

U.S. PATENT DOCUMENTS

| | | | | |
|---|---|---|---|---|
| 5,768,261 A | * | 6/1998 | Brownmiller et al. | 370/252 |
| 5,907,696 A | * | 5/1999 | Stilwell et al. | 703/13 |
| 5,958,009 A | * | 9/1999 | Friedrich et al. | 709/224 |
| 5,974,572 A | * | 10/1999 | Weinberg et al. | 714/47 |
| 6,278,966 B1 | * | 8/2001 | Howard et al. | 703/23 |
| 6,311,144 B1 | * | 10/2001 | Abu El Ata | 703/2 |
| 6,446,200 B1 | * | 9/2002 | Ball et al. | 713/1 |
| 6,625,657 B1 | * | 9/2003 | Bullard | 709/237 |
| 6,751,663 B1 | * | 6/2004 | Farrell et al. | 709/224 |
| 2002/0087378 A1 | | 7/2002 | Como | |
| 2002/0087379 A1 | | 7/2002 | Como | |
| 2002/0099813 A1 | * | 7/2002 | Winshell | 709/224 |
| 2002/0194179 A1 | | 12/2002 | Siefert | |
| 2003/0130886 A1 | | 7/2003 | Calderaro et al. | |
| 2003/0236689 A1 | | 12/2003 | Casati et al. | |
| 2004/0015382 A1 | | 1/2004 | Baca et al. | |
| 2004/0088417 A1 | | 5/2004 | Bober et al. | |
| 2004/0133347 A1 | | 7/2004 | Britt | |
| 2004/0162626 A1 | | 8/2004 | Farchmin et al. | |
| 2006/0004862 A1 | * | 1/2006 | Fisher et al. | 707/104.1 |

FOREIGN PATENT DOCUMENTS

EP         000674279         9/1995

* cited by examiner

*Primary Examiner*—David Silver
(74) *Attorney, Agent, or Firm*—Schultz & Associates, P.C.

(57) ABSTRACT

A method is disclosed that preparing a discrete event simulation model of a production network is provided including a client and a plurality of servers connected by a network comprising the steps of initiating a single business function trace test on the production network; gathering network flow trace data from the network; deriving a transaction summary from the network flow trace data; initiating a single business function load test on the production network; gathering resource data from the plurality of servers; normalizing the resource data; gathering web log data from at least one server from the plurality of servers; calculating a number of business functions running on the production network; calculating a consumption of resources used by the plurality of servers; calculating a business function cost associated with the consumption of resources; creating a business function profile from the transaction summary and the business function cost; and building a discrete event simulation model from the business function profile.

16 Claims, 6 Drawing Sheets

METHOD FOR BUILDING ENTERPRISE SCALABILITY MODELS FROM LOAD TEST AND TRACE TEST DATA

TECHNICAL FIELD OF THE INVENTION

The technical field of this invention is software, namely, software to organize performance data from complex computer networks and servers and arrange it for input into a discrete event simulator.

BACKGROUND OF THE INVENTION

The performance of large computer networks and servers and the distributed applications run on them is an area of considerable interest to the global economy as businesses become more diverse and applications more complex. In order for network systems to remain reliable and available, system performance must be constantly monitored and tested. Additionally, maintaining performance during expansion of a network or the deployment of new servers and applications can be a considerable task.

Modern software applications are characterized by multiple components residing on multiple clients and servers or "tiers" connected by a network. Often a single network can support thousands of clients and servers and be widely geographically dispersed. These networks are known as "multi-tiered systems". In many cases, a multi-tiered system includes use of the Internet to request and receive data for enterprise applications.

An enterprise application typically provides a variety of business functions that users may execute. For example, an online banking application may allow a user to access databases at a bank and manipulate data to check account status or transfer funds between accounts. The user's task is known as a business function.

When a business function is executed, a sequence of transactions is performed by the enterprise application operating on the components on the network. Each transaction consists of a request for data (or "stimulus") and a reply. The request takes the form of packets of data. The request travels from a client through multiple tiers of servers on the network and returns as a reply. Along the way, each component processes the incoming request. Processing can comprise a series of "loops" between servers requiring multiple "visits" to each server to process a single request. Processing consumes local resources such as CPU time and disk reads and writes. Each component then transfers the request down the line of servers to a final database server. The database server retrieves the requested data and generates a reply in the form of data packets. The reply travels back through each server returning to the client to complete the business function. In addition, each component may generate other requests to other components resident on other servers on the network.

In order to maintain and improve system performance, system managers must understand the performance of the applications running on the system and be able to identify and predict current and future performance problems, and evaluate potential solutions to those problems. The performance of the system can be measured by analyzing test data generated by automated load testing software. During a network load test the intent is to drive the resource utilization (CPU and I/O) up to measurable levels in order to compute the cost of the resources used by a business function. Examples of load testing software are "Loadrunner", available from Mercury Interactive and "Silktest", available from Seque. Test data consists of performance metrics such as percent CPU usage for a given period of time, the number of accesses to a hard drive memory or the number of bytes of data transmitted through the network.

The performance of a system can also be measured by the analysis of web log data and network flow trace data.

Web log data or throughput data is collected by web servers which typically log each HTTP command to the server. The typical web log reports the IP address of the machine making the request, the time of the request, the HTTP command and the size of the request from reply messages. A typical web log report can be generated by Microsoft Internet Information Services available from Microsoft Corporation and incorporated into Windows 2000 and Windows Server 2003.

The performance of a system can also be measured by analyzing network traces, available from packet sniffers, Ethernet sniffers or network or protocol analyzers. The packet sniffer captures each packet traveling along a computer network and decodes and analyzes its content according to the appropriate request for comments (RFC) documents or the specifications. Depending on the network structure, the packet sniffer can detect all or part of the traffic from a single machine operating within the network. However, there are methods which allow sniffers to operate in "promiscuous mode" to detect everything on the network at the node or computer to which it is attached. When attached to a local area network, the packet sniffer is connected to a monitoring port and mirrors all packets passing through all ports of the switch.

In the prior art, it is known to use discrete event simulators to aid in the analysis of network data. A discrete event simulator is a software tool that is used to develop a detailed model of a multi-tiered system and applications developed on that system. One discrete event simulator known in the art is sold under the trademark "IPS" and is available from HyPerformix, Inc. of Austin, Tex.

It is also known in the prior art for discrete event simulators to use network flow trace data to produce transaction summaries through automated network data analysis. The transaction summary contains a listing of the network flow of a business function. The network flow is the path of the transactions required to complete a business function including the number of visits to each server, the size of the request being made and the size of the returning reply. However, the transaction summary only contains network information and transaction flow information.

For example, Table 1 shows a transaction summary listing a business function name, a visit count, (equivalent to the number of "bounce" a message makes between servers) requester identity, replier identity, request size and reply size.

TABLE 1

| Business Function | Requestor | Replier | Visit Count | Request Size | Reply Size | CPU Time | Read Count | Read Size | Write Count | Write Size |
|---|---|---|---|---|---|---|---|---|---|---|
| BF_GetStatement | Client | Web | 1 | 486 | 2502 | ?? | ?? | ?? | ?? | ?? |
| BF_GetStatement | Web | App | 2 | 542 | 4023 | ?? | ?? | ?? | ?? | ?? |
| BF_GetStatement | App | DB | 4 | 22 | 538 | ?? | ?? | ?? | ?? | ?? |

The transaction summary also contains information related to the flow of a transaction between and among servers on the network such as shown in Table 2. Those skilled in the art will recognize that transaction flow can be much more complicated than the example shown in Table 2, including non-linear examples where branching of multiple threads is required. The prior art transaction summaries however, do not provide a summary of resource information.

TABLE 2

| Server Name | Resource consumption to be simulated |
| --- | --- |
| Client | Send 486 bytes request to web server |
| Web | Consume ?? seconds of CPU |
| Web | Perform ?? disk read operations, reading ?? bytes each time |
| Web | Perform ?? disk write operation, writing ?? bytes each time |
| Repeat 2 times | |
| Web | Send 542 byte request to application server |
| App | Consume ?? seconds of CPU |
| App | Perform ?? disk read operations, reading ?? bytes each time |
| App | Perform ?? disk write operations, writing ?? bytes each time |
| Repeat 2 times | |
| App | Send 22 byte request to database server |
| DB | Consume ?? seconds of CPU |
| DB | Perform ?? disk read operations, reading ?? bytes each time |
| DB | Perform ?? disk write operations, writing ?? bytes each time |
| DB | Send 538 byte reply to application server |
| App | Send 4023 byte reply to web server |
| Web | Send 2502 byte reply to client |

The transaction summary also contains a HTTP map of business function names, HTTP patterns and pattern types as shown below in Table 3.

TABLE 3

| Business Function | Http Pattern | Pattern Type |
| --- | --- | --- |
| BF_GetStatement | GET /bankapp/index.php.* HTTP | regexp |
| GetStyle | GET /bankapp/style.css | text |
| Login | GET /fmstocks7/ HTTP | text |
| View_Portfolio | GET /fmstocks7/Portfolio.* HTTP | regexp |
| Logout | GET /fmstocks7/Logout.aspx HTTP | text |

The pattern type can be "text" which indicates a simple text comparison is required to identify the HTTP command in the web log. The pattern type can also be "regexp" which is understood as a "regular expression" requiring pattern matching of the HTTP command in the web log. An HTTP map can be used to identify executions of a business function in a web log.

FIG. 1 depicts how a prior art discrete event simulator is used in the system analysis. Network flow trace data 157 is derived from a set of deployed servers or a system under test 155. Web log data 159 is collected from web servers as web log reports. Resource utilization data 160 is also collected from a set of deployed resource monitors on a system under test 155. A discrete event model generator 165 is then used to create a discrete event model 170 of the processes running on the deployed servers or system under test 155. The discrete event model consists of a transaction flow, a simulation of resource consumption for each server, and the size of the data message received and sent during the operation. The discrete event model approximates and summarizes enterprise application transactions distributed over the network. In the prior art, the discrete event models have required very detailed analysis of production data requiring a time consuming process of defining transaction paths for many requests made by different applications simultaneously. A prior art simulation model typically takes weeks of time to complete.

The discrete event model forms a set of instructions to the discrete event simulator 175 used to simulate the execution of the business function. The discrete event simulation can then be analyzed and observed to perform basic capacity planning analysis for the network. CPU and disk behavior can be estimated as well as multi-tiered system behavior. By changing the model and reprogramming the simulator, predictions can be developed for future system load performance and planning.

Network test data may be collected by software applications known as resource monitors. Examples of resource monitors include Tivoli I™, available from Tivoli, HP Measureware, available from Hewlett Packard of Palo Alto, Calif. and BMC PatrolPerform available from BMC.

The type of data collected by the resource monitors and the frequency of collection differ. For example, disk input/output data is often collected in terms of total numbers of reads and writes, total read bytes and total write bytes that occur during the monitoring period. CPU usage is usually collected in percentage of usage over time. The data is typically bulky with data files which are tens of megabytes to multiple gigabytes in size; the data can come from many sources. Another example is performance monitoring programs that collect data directly from various hardware devices such as CPU's and hard disk drives. The data is typically not isomorphic; that is the data can have many formats. It is not uncommon to have multiple production data files that are logically related. For instance, they may capture activity on different network segments which overlap. The files must be merged and synchronized in order to be useful.

In the prior art, the format in which typical resource monitors collect data hinders the modeling process. Data preparation analysis tools have been developed to aid in this process, however they do not support the ability for modeling a business functions utilizing more than one application nor do other modeling methodologies provide for modeling a business function running on more than one server.

Also in the prior art, the discrete element models developed have been far too detailed to allow analysis of production data to derive helpful predictions quickly.

In a particular piece of prior art to Abu, et al., U.S. Pat. No. 6,560,569 B1, a system is disclosed which is an input module, a construction module, performance metrics module and an output module to create and output several models of a proposed information design system. The input module receives descriptive input which is validated and transformed into quantitative output. This construction model uses the quantitative input and information from a library of hardware and software component models to create and calibrate one or more models. The performance metrics module calculates performance metrics for the modules, which can then be compared based on these metrics. However, the method is extremely time intensive requiring iterations at several points to verify and correct deficiencies in models created. Additionally, the method requires a database of component models which were designed by the information system designer which must determine the function of each subcomponent of each system before developing the models.

Therefore a need exists for analyzing and preparing production data quickly to allow for performance modeling and analysis of a network and for combining resource data, transaction summaries and web log data to complete efficient production of discrete event models of business functions for discrete event simulations.

SUMMARY OF THE INVENTION

In one embodiment of the present invention, a method of preparing a discrete event simulation model of a production network is provided including a client and a plurality of servers connected by a network comprising the steps of initiating a single business function trace test on the production network; gathering network from trace data from the network; deriving a transaction summary from the network flow trace data; initiating a single business function load test on the production network; gathering resource data from the plurality of servers; normalizing the resource data; gathering web log data from at least one server from the plurality of servers; calculating a number of business functions running on the production network; calculating a consumption of resources used by the plurality of servers; calculating a business function cost associated with the consumption of resources; creating a business function profile from the transaction summary and the business function cost; and building a discrete event simulation model from the business function profile.

In a further embodiment of the invention, a computer program product adaptable for storage is provided on a computer readable medium and operable for creating a discrete event simulation model of a business function comprising the program steps of gathering resource data from a function load test on a plurality of servers deployed on a network; wherein the resource data includes a reporting interval, a plurality of timestamps, and a plurality of resource utilization indicators; equalizing at least one reporting interval in the resource data; synchronizing at least one time stamp in the resource data; normalizing at least one set of units in the plurality of resource utilization indicators; gathering network data from a functional trace test; deriving a transaction summary from the network data; deriving web log data from the function load test; calculating a number of business functions from the web log; calculating a resource consumption for the plurality of servers; deriving a business function profile from the resource data and the number of business functions; adopting a transaction flow from the transaction summary; and building a discrete event simulation model from the business function profile and the transaction flow.

In another embodiment of the invention, a method of preparing an instruction table of a business function is provided for a discrete event simulation modeler comprising the steps of measuring network flow trace data on a network; analyzing the network flow trace data to derive a transaction summary; gathering resource data from a plurality of servers on the network; gathering web log data from at least one server on the network; calculating a number of business functions from the web log; calculating a resource consumption from the resource data; calculating a business function cost; creating a business function profile from the business function cost; and building an instruction table from the transaction summary and the business function profile.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present invention is described in terms of an apparatus and method for creating discrete event models from production or load test data and estimating transaction cost for execution of business functions on multi-tiered systems. Persons skilled in the art, however, will recognize that any computer system that includes suitable programming means for operating in accordance with the disclosed methods also falls well within the scope of the present invention. Suitable programming means include any means for directing a computer system to execute the steps of the method of the present invention. The present invention also may be embodied in a computer program product, which is implemented by use of a recording medium for machine-readable information such as a diskette or other recording medium suitable for use with a data processing system. Although most of the exemplary embodiments described in this specification are oriented to software installed and executing on computer hardware, alternative embodiments may be implemented as firmware or as hardware and are within the scope of the present invention.

Figure 1:
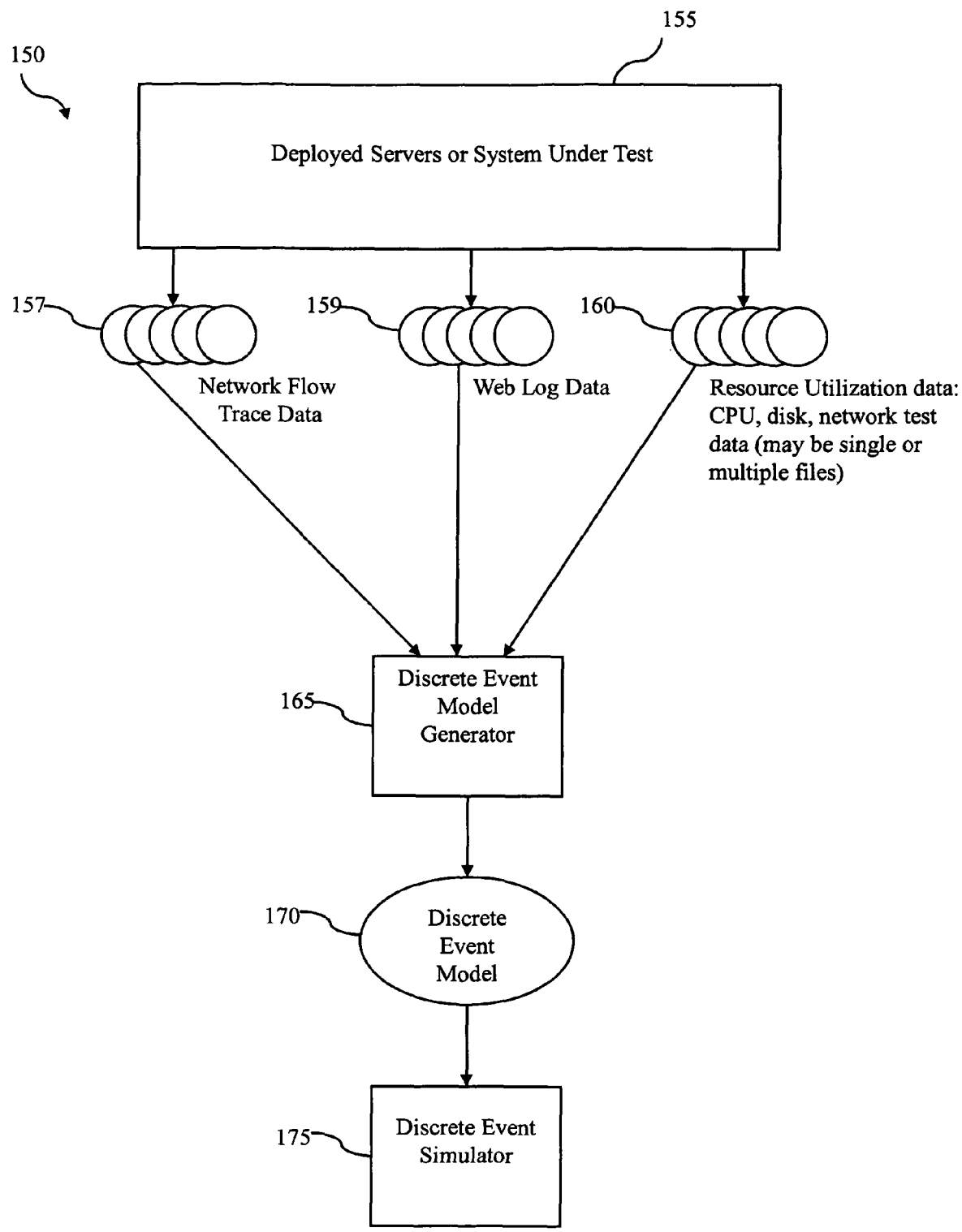
FIG. 1 is a block diagram illustrating the use of a prior art discrete event simulator.
Figure 2:
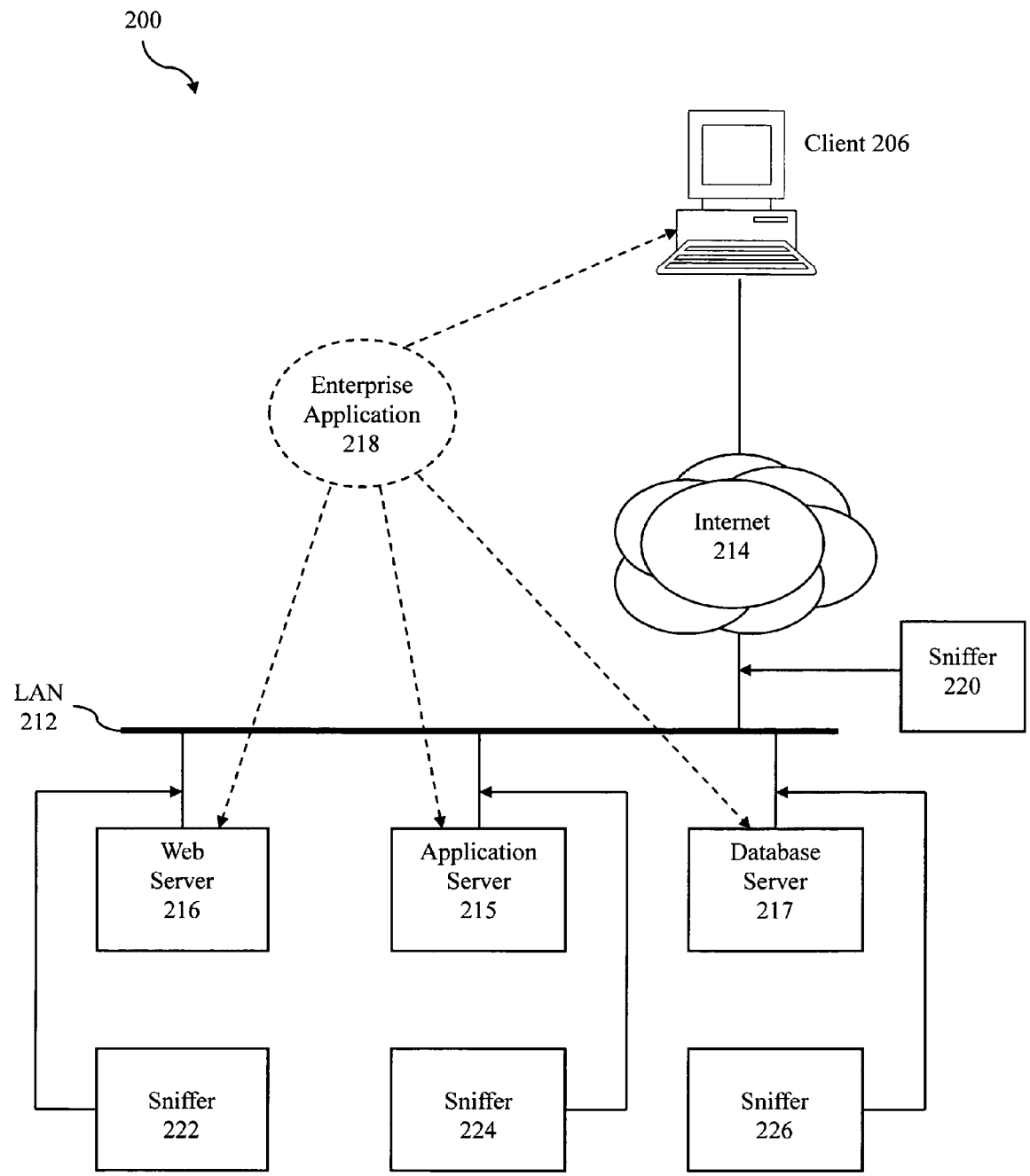
FIG. 2 is a block diagram illustrating an enterprise application and a set of network sniffers deployed on a four-tier computer network.

Turning now to FIG. 2, illustrated is a network 200. In network 200, a user (not shown) operates a client 206. The client 206 executes an enterprise application 218 operating on servers over the network. Components of enterprise application 218 are resident on the application server 215, web server 216 and database server 217. In this example, the client is connected to the servers through Internet 214 and local area network 212. Also shown is a set of network sniffers 220, 222, 224 and 226 deployed on connections between LAN 212 and client 206, web server 216, application server 215 and database server 217, respectively. Resource monitors 320, 321 and 322 and web analyzer 323 are also resident on web server 216, application server 215 and database server 217, respectively. Of course, those skilled in the art will recognize that the networks involved may be local or wide area networks. Those skilled in the art will also recognize that each of the servers and clients can be multiple machines connected logically or a single machine with appropriate partitions.

The servers and network cooperate to provide the business function. For example, all of the servers play a part in providing a banking business function such as "transferring funds." In order to transfer funds the client initiates an activity from a browser resident on client 206 and transmits it through internet 214 to web server 216. Web server 216 is largely responsible for providing static content for the client such as unvarying text and images displayed for the client and conducting encryption and decryption services for secure data. Application server 215 is responsible for logically operating on the request to do calculations or otherwise manipulate data into file form and for requesting data from the database server. Database server 217 is largely responsible for database operations including the alteration of data, recording of data and storage functions typical to databases. A directory server (not shown) may also be present and provide user authentication services over the network.

The operation of enterprise application 218 requires CPU usage, hard disk usage, and input/output from the network interface cards on each of servers 215, 216, 217 and on client 206. While processing the request, application server 216 may also receive requests for other business functions from other client computers via internet 214. As a result, application server 216 and additional servers 215 and 217 partition CPU usage, hard disk usage, and input/output from their network interface cards during the operation of enterprise application 218 in order to fulfill the requirements of any number of requests.

Figure 3:
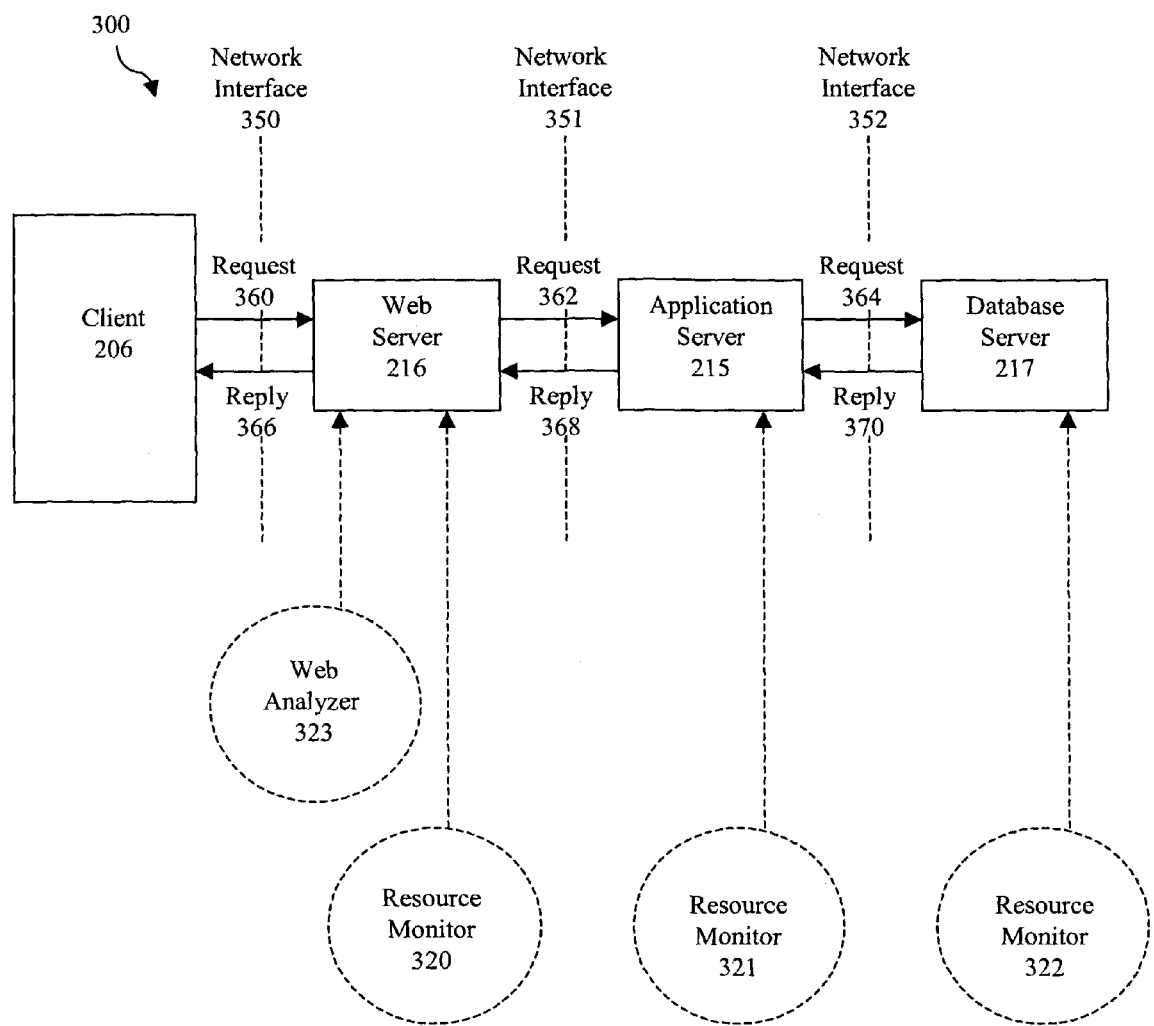
FIG. 3 is a block diagram illustrating the deployment of a set of resource monitors deployed on a four-tier computer network and logical network communication paths between the tiers of a four-tier computer network.

FIG. 3 shows client 206 making a request for information from database server 217. In the process, client 206 must communicate a request in the form of a series of bytes transmitted through a network to web server 216. Web server 216 operates on the request and transmits it to application server 215 which in turn operates on the request and transmits it to database server 217. Database server 217 gathers data and replies to application server 215, which in turn replies to web server 216, which in turn replies to client 206 through the paths shown. Each of the requests can and often does contain different numbers of bytes transmitted at different times containing different messages between the tiers on the network. Each request can also contain more than one message or "bounce" between servers.

Figure 4:
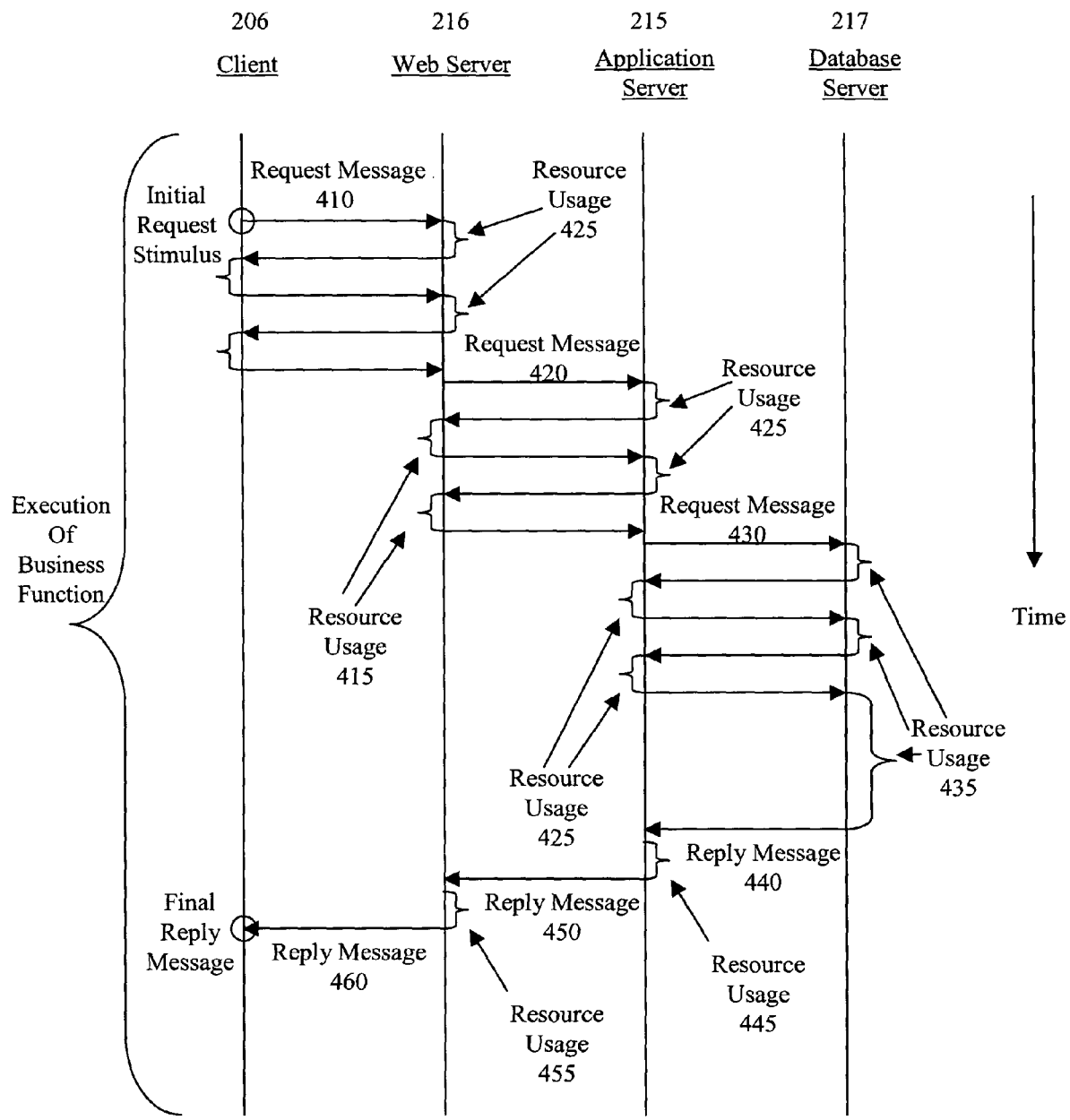
FIG. 4 is a schematic representation of the execution of a business function on a network system.

Turning to FIG. 4, a schematic diagram is shown showing execution of a business function between different network tiers. The vertical lines in FIG. 4 represent boundaries between tiers for components resident on servers on the network. Specifically, client 206, web server 216, application server 215 and database server 217. Time progresses from the top of the diagram to the bottom. During execution of a business function an initial request stimulus is made by client 206 the request includes request message 410 which is transmitted from client 206 to web server 216. The request includes a packet of data containing a certain number of bytes and can include a number of return "bounces" or loops to complete transmission of the message to the web server. When the request message is received by web server 216 it operates on that request and consumes a certain resource usage 415. That resource usage can include CPU utilization, disk read operations and disk write operations. Web server 216 then transfers request 420 to application server 215 over the network including a message of a certain length of bytes. Request 420 can also include a number of bounces. Resource usage 425 is required by application server to operate on the request. Application server 215 then transfers request message 430 to database server 217 in a certain number of bytes and a certain number of bounces. Database server 213 operates on the message requiring resource usage 435. The length of the delay between receipt of a request message and transmission of the request to a different tier is signified by the distance proportional to the delay required.

After the resource usage 435 database server generates a reply message of a certain length of bytes 440 and transmits it back to application server 215. Application server 215 again utilizes resources 445 and generates a reply message 450 of a certain length of bytes to be sent web server 216. Typically, bounces are not present in reply messages.

Web server 216 receives the reply message and utilizes resources 455 to generate a reply message 460 which is then sent back to client 206 completing the execution of the business function.

As shown in FIG. 3, resource monitors 320, 321 and 322 are software tools which typically monitor resource utilization on servers such as CPU utilization, network utilization such as bytes sent and received on a network interface card and disk utilization, such as disk operations and bytes from read or write operations. The resource monitors generate resource utilization reports for each server under observation. A typical resource utilization report is shown in Table 4 below.

TABLE 4

| Date | Time | System Name | CPU Utilization | Disk Read Ops/sec | Disk Read Bytes/sec | Disk Write Ops/sec | Disk Write Bytes/sec |
|---|---|---|---|---|---|---|---|
| Jan. 1, 2005 | 13:20:00 | Web | 15.0% | 10 | 30,294 | 2.3 | 10,358 |
| Jan. 1, 2005 | 13:21:00 | Web | 5.0% | 7 | 40,033 | 21.5 | 209,039 |
| Jan. 1, 2005 | 13:22:00 | Web | 45.0% | 25 | 103,003 | 10.2 | 95,085 |
| Jan. 1, 2005 | 13:23:00 | Web | 35.0% | 20 | 85,938 | 7.9 | 75,395 |

The data in Table 4 was produced from the resource monitor sold under the trademark "OpenView Performance Agent" available from Hewlett Packard, of Palo Alto, Calif. In this example, the report includes data collected at one-minute time intervals, time stamping the measurements of the production data at the beginning of each minute.

Other resource monitors, such as Microsoft Performance Monitor, record data in a less consistent manner as shown in Table 5 below.

TABLE 5

| Date | Time | System Name | CPU Utilization | Disk Read Ops/sec | Disk Read Bytes/sec | Disk Write Ops/sec | Disk Write Bytes/sec |
|---|---|---|---|---|---|---|---|
| Jan. 1, 2005 | 13:20:35 | web | 15.3% | 10.2 | 30,294 | 2.3 | 10,358 |
| Jan. 1, 2005 | 13:21:05 | web | 5.1% | 7.3 | 40,033 | 21.5 | 209,039 |
| Jan. 1, 2005 | 13:21:35 | web | 45.2% | 30.9 | 103,003 | 10.2 | 95,085 |
| Jan. 1, 2005 | 13:22:05 | web | 35.3% | 25.0 | 85,938 | 7.9 | 75,395 |

In the example in Table 5, the first timestamp reported is when the resource monitor program is first started. Subsequent measurements are made at an interval specified by user of the program. In this example, the sampling interval was 30 seconds with timestamping at the beginning of each 30-second period. Other resource monitoring tools record measurements with inconsistent intervals. For example, these performance monitors will wait for a specified interval, make a measurement, and then wait for a specified interval again without taking into account the time required to collect and record the measurements. As a result, the measurement interval is longer than that reported and may vary from interval to interval.

As further shown in FIG. 3, web analyzer 323 is a software tools which monitor and parse log files from a web server and calculate indicators of values contained in this log file related to how and when a web server is visited. For example, web log analyzers report the number of visits and the number of unique visitors to a website, the duration of the visit and the most recent visit. Web analyzers also report authenticated users time, date and frequency of use, including domains and countries of host visitors. Web analyzers also report host lists, file types, operating systems, browsers, search engines, key phrase, key words and HTTP errors.

Figure 5:
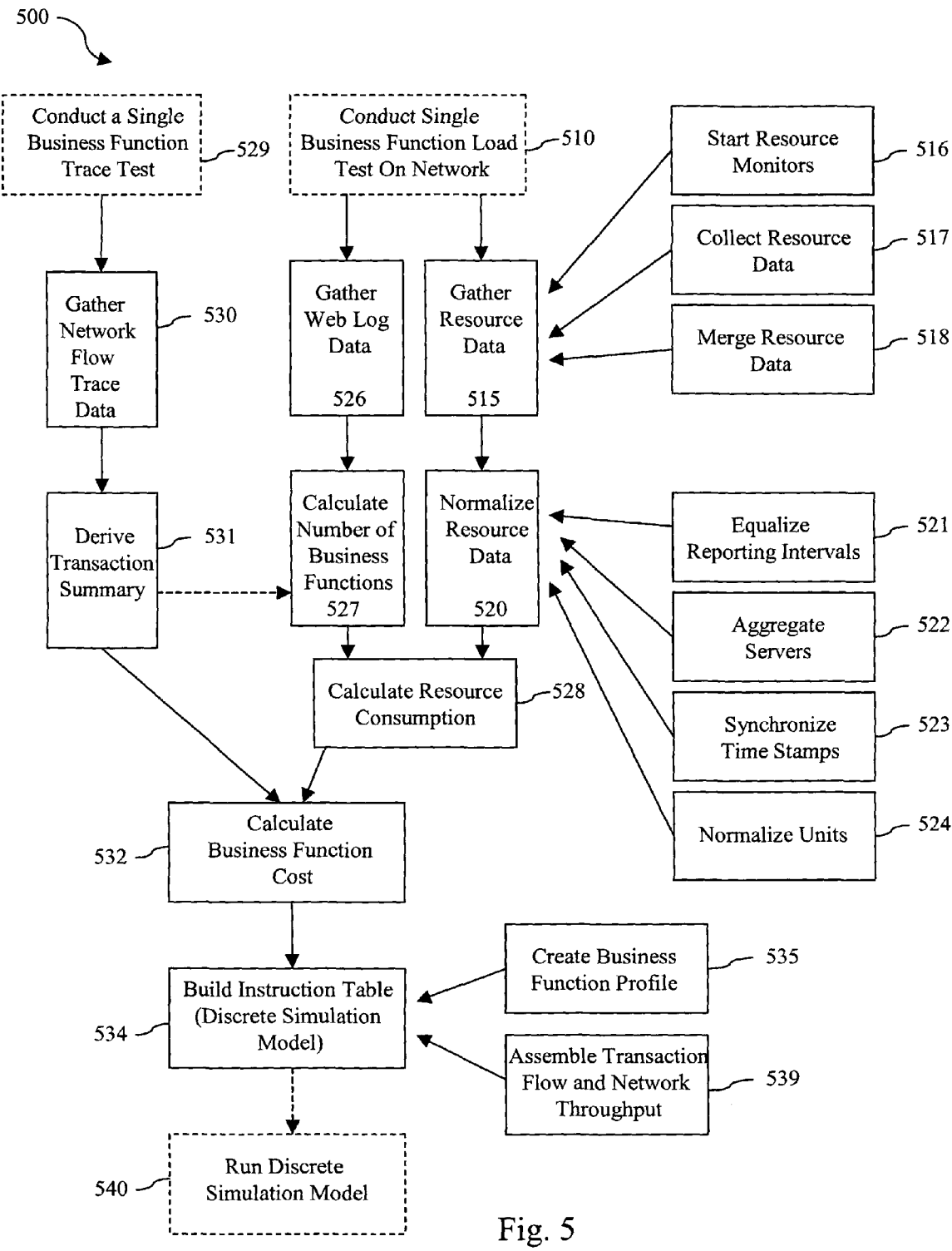
FIG. 5 is a block diagram depicting the methodology of one embodiment of the present invention.

Web analyzers useful in the current invention include "Webalyzer", which is a GPL application which generates usage and access analysis and logs and Microsoft Internet Service available from Microsoft Corporation or Apache HTTP Server, which is an open source HTTP web server for UNIX based systems or BSD for LINUX and UNIX systems. Another example is Novell Netware, available from Novell, Inc. An example of a web log from Microsoft IIS is shown in Table 5 below:

FIG. 5 shows a preferred embodiment of the method steps of the current invention. At step 510, a single business function load test is run on a set of deployed servers or system under test. The load test on the network will result in test data on each of the servers resident on the network and on the network at measurable levels.

At step 515, production data is gathered by resource monitors which are resident on each server on the system under test. The step of gathering requires that all servers be synchronized in time. Time clocks can be synchronized by known tools which align the clocks of each server. The step of gathering resource data also requires that each of the resource monitors be properly invoked at step 516 and that proper production data be collected at step 517. A data file is provided by each resource monitor. The files are copied into a central location. In the preferred embodiment a separate analysis computer is used so as not to effect the network environment. At the central location the data files from the resource monitors are synchronized and merged into a single table at step 518.

At step 520, the resource data gathered in step 515 may be normalized. If the resource data gathered is in a uniform format the step of normalization is not required. In order to normalize the resource data several problems must be addressed.

The resource monitoring reporting intervals must be equalized at step 521. For example, if one resource monitor reports data every sixty (60) seconds and another reports every thirty (30) seconds, the latter will generate twice as many measurements as the former, leading gaps in the merged data file as follows:

TABLE 6

| Source IP | Date | URL | Bytes Received | Bytes Sent |
|---|---|---|---|---|
| 192.168.1.101 | May 21, 2003:10:35:00 | GET /bankapp/index.php?account=...HTTP/1.1 | 200 | 4409 |
| 192.168.1.101 | May 21, 2003:10:35:00 | GET /bankapp/style.css HTTP/1.1 | 200 | 118 |
| 192.168.1.101 | May 21, 2003:10:35:00 | GET /bankapp/style.css HTTP/1.1 | 200 | 118 |
| 192.168.1.101 | May 21, 2003:10:35:01 | GET /bankapp/index.php?account=...HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/index.php?account=...HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/index.php?account=...HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:02 | GET /bankapp/index.php?account=...HTTP/1.1 | 200 | 4409 |

TABLE 7

| Date | Time | Web Server CPU Utilization % | App Server CPU Utilization % | Web Server Rate Data Ops/sec | App Server Rate Data Ops/sec |
|---|---|---|---|---|---|
| Jan. 1, 2005 | 00:00:00 | 10.0 | 20.0 | 100 | 500 |
| Jan. 1, 2005 | 00:00:30 | ? | 25.0 | ? | 500 |
| Jan. 1, 2005 | 00:01:00 | 15.0 | 30.0 | 300 | 500 |
| Jan. 1, 2005 | 00:01:30 | ? | 20.0 | ? | 500 |

In order to correct for the inconsistency in reporting intervals, data is extrapolated in the merged table to report the same utilization during the measurement interval. With respect to data reported in percent utilization, such as CPU Utilization it is presumed that the percentage utilization for each unreported period is the same as in the preceding period. With respect to rate data such as Bytes Transmitted Per Second or Operations Per Second it is presumed that the rates remain the same for the non-reported period as they were in the previous period. Table 8 illustrates the results of the extrapolation process for this example.

TABLE 8

| Date | Time | Web CPU Utilization | App CPU Utilization | Web Server Rate Data Ops/sec | App Server Rate Data Ops/sec |
|---|---|---|---|---|---|
| Jan. 1, 2005 | 00:00:00 | 10.0 | 20.0 | 100 | 500 |
| Jan. 1, 2005 | 00:00:30 | 10.0 | 25.0 | 100 | 500 |
| Jan. 1, 2005 | 00:01:00 | 15.0 | 30.0 | 300 | 500 |
| Jan. 1, 2005 | 00:01:30 | 15.0 | 20.0 | 300 | 500 |

A similar problem is encountered in reconciling data from resource monitors which report asynchronous or random measurement intervals. An example is shown in Table 9. In this example the resource monitor reports data at ninety (90) second intervals beginning at time 00:20.

TABLE 9

| Date | Time | Web CPU utilization | App CPU utilization |
|---|---|---|---|
| Jan. 1, 2005 | 00:00:15 | 10.0 | ? |
| Jan. 1, 2005 | 00:00:20 | ? | 20.0 |
| Jan. 1, 2005 | 00:00:45 | 15.0 | ? |
| Jan. 1, 2005 | 00:01:50 | ? | 20.0 |

The differing measurement intervals can be compensated for by copying previous utilization reported into the time interval from one resource interval into the non-reported interval for the other resource tool. A common time synchronization is required. Therefore, data preceding the earliest reported data for any server under test is dropped from consideration. In the example of Table 10, all entries before 00:20 are dropped because the application server CPU utilization for that time interval is the first reported data. Table 10 shows the results of execution of this step in for this example.

TABLE 10

| Date | Time | Web CPU utilization | App CPU utilization |
|---|---|---|---|
| Jan. 1, 2005 | 00:00:20 | 10.0 | 20.0 |
| Jan. 1, 2005 | 00:00:45 | 15.0 | 20.0 |
| Jan. 1, 2005 | 00:01:50 | 15.0 | 20.0 |

Figure 6A:
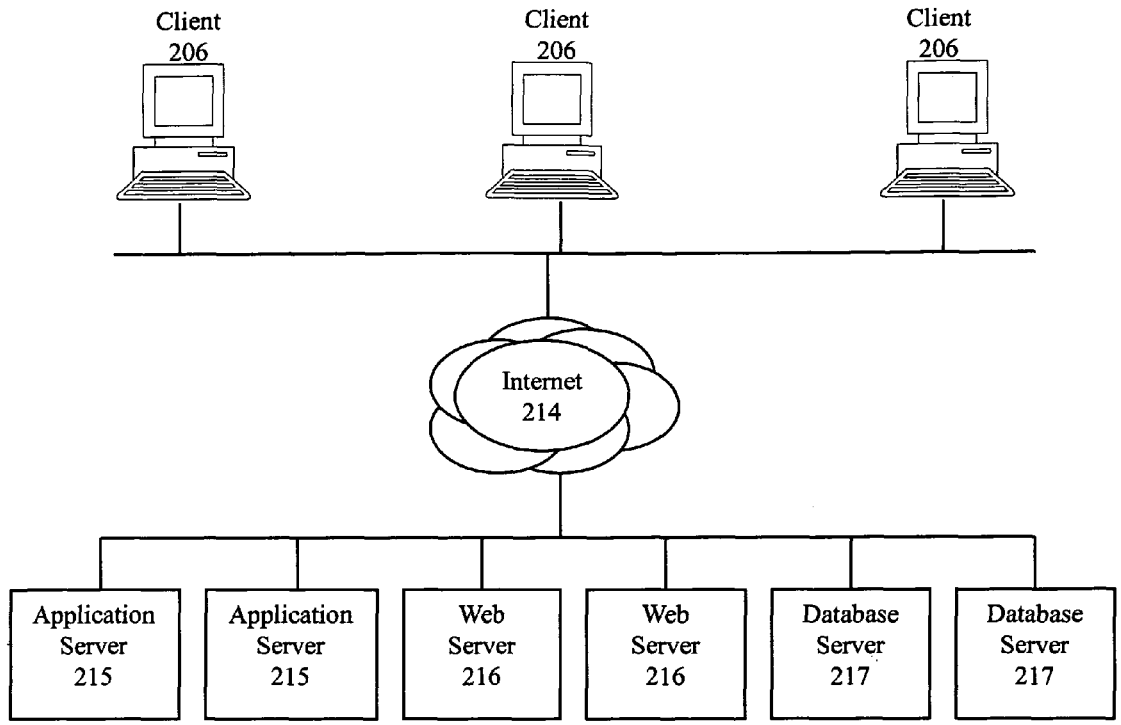
FIG. 6a is a block diagram of a non-aggregated multi-tiered system.
Figure 6B:
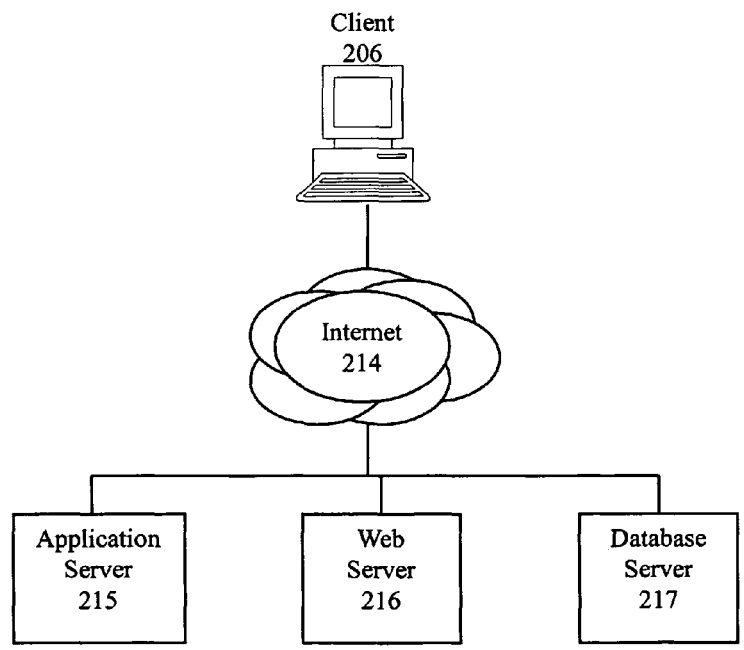
FIG. 6b is a block diagram of an aggregated multi-tiered system.

Normalizing the production data also requires that multiple servers that perform the same function and share the same load be aggregated into a single megaserver for purposes of calculating transaction cost at step 522. A multi-tiered system may have more than one client and server on each tier as shown in FIG. 6*a*. Resources at each tier are aggregated into a single machine on each tier resulting in a simplified system as shown in FIG. 6*b*. In order to aggregate servers, server measurements are adjusted to account for differences in performance. For example, CPUs with different performance characteristics are normalized so that all utilizations represent a consistent CPU performance. An example of this adjustment is adjusting the number of operations per second to a consistent rate. As another example, servers which contain different numbers of CPU's have CPU time distributed over the number of CPU's to arrive at a single CPU measurement.

Returning to FIG. 5, normalization also requires that data from resource monitors that time stamp measurements at the end of a measurement interval be adjusted so that time stamps are consistently at the beginning of each interval at step 523.

Additionally, normalization requires that units be consistent; such as changing kilobytes to bytes and per minute to per second measurement, which is accomplished at step 524.

If the period over which data is analyzed is longer than the measurement interval at which the resource utilization is sampled, then each calculation must be repeated for each measurement interval within the desired time period from which the model is being derived and accumulated in a running total. The accumulated running total yields a total resource consumption during the period over which data is analyzed.

At step 526 web analyzer 323 is polled to gather web log data such as described into a report which is uploaded and stored for further use.

At step 527, the number of business functions is calculated. The number of business functions is calculated by analyzing the web analyzer results which are deployed on the web server on the network, in this example, web analyzer 323, for the time period under which the network is to be analyzed. The transaction summary provided as input to the method provides a mapping of business functions to URLs used by the business function. The URLs provided are used to search for matches in the web log data either as "text" requiring a simple text matching search or "regular expressions" requiring pattern matching. The number of business functions is calculated by counting the number of unique URLs that mark the beginning of each business function in the web log table. For example, in the example web log table shown below, a single URLs is identified and counted (shown as bold) by pattern matching.

TABLE 11

| Source IP | Date | URL | Bytes Received | Bytes Sent |
|---|---|---|---|---|
| 192.168.1.101 | May 21, 2003:10:35:00 | GET /bankapp/index.php?account=... HTTP/1.1 | 200 | 4409 |
| 192.168.1.101 | May 21, 2003:10:35:00 | GET /bankapp/style.css HTTP/1.1 | 200 | 118 |
| 192.168.1.101 | May 21, 2003:10:35:00 | GET /bankapp/style.css HTTP/1.1 | 200 | 118 |
| 192.168.1.101 | May 21, 2003:10:35:01 | GET /bankapp/index.php?account=... HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/index.php?account=... HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:01 | GET /bankapp/index.php?account=... HTTP/1.1 | 200 | 4409 |
| 192.168.1.101 | May 21, 2003:10:35:01 | GET /bankapp/style.css HTTP/1.1 | 200 | 118 |
| 192.168.1.101 | May 21, 2003:10:35:02 | GET /bankapp/index.php?account=... HTTP/1.1 | 200 | 4409 |

In this example there are several executions of the BF_GetStatement business function in the web log. In order to count how many time a business function is used the HTTP pattern for the BF_GetStatement business function is referenced in the HTTP map provided by the transaction summary. In this example, the business function is named BF_GetStatement from Table 3. Unique pattern used to identify the BF_GetStatement business function is GET/bankapp/index/php/* HTTP.

Using this pattern the web log is searched to find that there are five executions of the BF_GetStatement business function in this example.

Moving to step 528, the method of the preferred embodiment calculates resource consumption for each tier on the network over a discrete measurement time period. Resource measurements are usually expressed in "utilization" or rates. Utilization is expressed as a percentage and is understood to be the percentage of the resource that was in use during the measurement period.

Rates are typically given in units of operations per time where operations can be transactions, bytes, reads, writes or other discrete events that can be accumulated.

The generalized calculation is:

(resource utilization during measurement period)*(length of measurement period)=(resource consumption)

For example, resource consumption for 10% CPU utilization might be calculated for a 30-second time interval as follows:

(10% CPU utilization)*(00:00:45−00:00:15)=0.10*30 seconds=3 seconds

As another example, resource consumption for a rate of 5 disk reads per second for a 30 second time interval might be calculated as follows:

(5 disk reads/second)*(00:00:45−00:00:15)=5*30 seconds=150 disk reads

Moving to step 529, a single business function trace test is run on a set of deployed servers for a system under test.

At step 530, network flow trace data is measured by the network sniffers adjacent servers on the network.

As known in the art, network data is analyzed at step 531 through the use of known automated network data analysis techniques to arrive at a transaction summary. The transaction summary includes the table defining transaction flow for the business function under test and other network data. Network data analysis also creates the HTTP map tells the pattern to use to identify a business function in a web log.

Moving to step 532, the method provides a calculation of business function cost.

A discrete event simulator requires as input resource consumption to be expressed in business function resource utilization for each individual stimulus or event (or business function).

The generalized calculation is as follows:

(Resource consumption)/(number of business functions performed during measurement time period)=(business function resource usage)

Each measured resource usage is divided by the number of business functions derived from the web logs to arrive at a resource consumption estimate for each business function. For example, if a resource consumption for a CPU utilization is three (3) seconds and the number of business functions performed during the measurement period is 300, the transaction cost in CPU seconds is 0.01.

The general calculation is carried out for each measured resource on each server for the system and built into a table called a business function resource summary as shown in the following example in Table 12:

TABLE 12

| Server Name | CPU seconds | Disk Read Operations | Disk Write Operations | Disk Bytes Read | Disk Bytes Written |
|---|---|---|---|---|---|
| web | 0.010000 | 10 | 1 | 5,120 | 512 |
| app | 0.030000 | 6 | 0 | 1,280 | 0 |
| database | 0.020000 | 100 | 200 | 64,000 | 100,000 |

Moving to step 534, the method requires building an instruction table for a discrete simulation model. Instructions for discrete simulation model follows a transaction from a client through a set of servers as a request and returns to the client from the servers through a set of replies. During the transaction flow, each server consumes resources and transmits messages between other tiers on the network in the form of a number of bytes.

At step 534, building the instruction table for the discrete simulation consists of two substeps, construction of a business function profile, step 535 and assembling the transaction flow and network throughput, step 539.

Moving to step 535, the method creates a business function profile from the business function summary. To complete a business function profile, the business costs listed in the business function summary are distributed evenly among the transactions that the business function executes which are listed in the transaction summary. For example, for each resource used by a business function, the transaction cost is calculated as follows:

(business function research usage)/(transaction visit count)=(transaction resource usage).

The transaction visit count is taken from the transaction summary provided as input to the method. For example, if the business function resource usage of disk read operations is 6 and the visit count is 2, the transaction resource usage will be 3. As another example, if the business function resource usage of disk bytes read is 64,000 and the visit count is 4, the resulting transaction resource usage will be 16,000. The per transaction costs are computed and added to the business function summary to create a complete business function profile that lists network, CPU and I/O resource consumption. An example of a completed business function profile is shown in Table 13 below.

TABLE 13

| Requestor | Replier | Visit Count | Request Size | Reply Size | CPU Time | Read Count | Read Size | Write Count | Write Size |
|---|---|---|---|---|---|---|---|---|---|
| Client | Web | 1 | 486 | 2502 | 0.010 | 10 | 5120 | 1 | 512 |
| Web | App | 2 | 542 | 4023 | 0.015 | 3 | 640 | 0 | 0 |
| App | DB | 4 | 22 | 538 | 0.005 | 25 | 16000 | 50 | 25000 |

The discrete event simulator must also generally have provided a transaction flow before the model will function. Transaction flow can be linear or non-linear. The method of the invention derives the transaction flow from the transaction summary provided as input to the method.

The discrete event simulator must also have provided the size of the message or network throughput for each request or reply for each transaction.

Data packets used in the construction of the requests and replies for each transaction is reported for each server by the resource monitors. However, the network sniffers report the number of data packets and payload directly and are included in the transaction summary provided as input to the method.

Returning to FIG. 5, at step 539 the method requires assembling the transaction flow and network throughput into a final instruction set for the discrete event simulator. The instruction set is known as a "business function profile." This provides the final amount of information needed to complete the set of instructions for the discrete event simulator for each business function.

In the instant linear example:

TABLE 14

| Server Name | Resource consumption to be simulated |
|---|---|
| Client | Send 486 bytes request to web server |
| Web | Consume 0.010 seconds of CPU |
| Web | Perform 10 disk read operations, reading 5120 bytes each time |

TABLE 14-continued

| Server Name | Resource consumption to be simulated |
|---|---|
| Web | Perform 1 disk write operation, writing 512 bytes each time |
| Repeat 2 times | |
| Web | Send 542 byte request to application server |
| App | Consume 0.015 seconds of CPU |
| App | Perform 3 disk read operations, reading 640 bytes each time |
| App | Perform 0 disk write operations, writing 0 bytes each time |
| Repeat 2 times | |
| App | Send 22 byte request to database server |
| DB | Consume 0.005 seconds of CPU |
| DB | Perform 25 disk read operations, reading 16000 bytes each time |
| DB | Perform 50 disk write operations, writing 25000 bytes each time |
| DB | Send 538 byte reply to application server |
| App | Send 4023 byte reply to web server |
| Web | Send 2502 byte reply to client |

At step 540, the method shows submitting the business function profile as a model to the discrete event simulator to allow forecasting related to the network and servers under test for use in scalability analysis.

The invention claimed is:

1. A method of scaling a production network, the production network including a client computer connected to a plurality of servers on which a set of business functions are running, where each business function is a user task having a sequence of transactions between the client computer and the plurality of servers, comprising the steps of:
    initiating a single business function trace test on the production network for a single business function in the set of business functions;
    gathering network flow trace data from the production network;
    deriving a transaction summary from the network flow trace data wherein the transaction summary comprises a tabular listing of the sequence of transactions for each business function in the set of business functions, the tabular listing including information related to resource usage within the plurality of servers;
    initiating a single business function load test on the production network;
    gathering a set of resource data from the plurality of servers;
    normalizing the resource data;
wherein the step of normalizing further comprises:
    synchronizing and merging the set of resource data into a single table, converting the set of resource data to a set of consistent units, equalizing the set of resource data to a set of standard measurement intervals by extrapolating a set of utilization data within the set of resource data and, aggregating a set of servers, from the plurality of servers, into a mega server;

gathering web log data from at least one server from the plurality of servers for the single business function;

deriving a measured number of executions of the single business function on the production network during a predefined time period on the production network;

calculating a first consumption of resources used by the plurality of servers;

calculating a business function cost for the single business function by dividing the first consumption of resources by the measured number of executions of the single business function;

creating a business function profile from the transaction summary and the business function cost for the single business function;

building a discrete event simulation model from the business function profile;

optimizing the production network to provide a scaled production network, by performing a simulation with the discrete event simulation model in a simulation application running on an analysis computer; and producing a report of the scaled production network on the analysis computer.

2. The method of claim 1 wherein the step of creating a business function profile further comprises the steps of:

deriving a transaction visit count from the transaction summary; and calculating a transaction resource usage by dividing a business function resource usage by the transaction visit count.

3. The method of claim 1 wherein the step of gathering resource data further comprises the steps of:

deploying one of a plurality of resource monitors on each server resident on the existing production network;

collecting the resource data from the plurality of resource monitors; and merging the resource data into a single file for analysis.

4. The method of claim 1 wherein the sub-step of equalizing further comprises the steps of:

interpolating and extrapolating a set of data into the set of resource data; and, the sub-step of synchronizing further comprises the step of adjusting a pair of time stamps, of the set of resource data, to appear at the beginning of a measurement interval.

5. The method of claim 1 wherein the step of calculating a consumption of resources further comprises the steps of:

calculating a second consumption of resources; and, multiplying the second consumption of resources by a measurement period.

6. The method of claim 5 wherein the step of calculating a second consumption of resources further comprises the step of:

repeating the step of multiplying and accumulating a total value of consumption of resources.

7. The method of claim 1 wherein the step of calculating a first consumption of resources further comprises the steps of:

searching the transaction summary data for a regular expression match;

searching the transaction summary data for a text expression match; and, counting a number of unique URL occurrences in the web log data.

8. The method of claim 1 comprising the further step of:

running the discrete event simulation model on a discrete event simulation modeler.

9. A system for optimizing and scaling a production network, the production network comprising a plurality of servers which operates a set of business functions, where each business function is a user task having a sequence of transactions between a client computer and the plurality of servers, a collection of network sniffers deployed on the production network, an analysis computer connected to the production network and the collection of network sniffers, the analysis computer programmed to carry out the steps of:

loading a discrete event simulation tool;

gathering resource data from a business function load test on the plurality of servers;

wherein the resource data includes a reporting interval, a plurality of timestamps, and a plurality of resource utilization indicators for a single business function in the set of business functions;

merging the resource data into a single table;

equalizing at least one reporting interval in the resource data to a standard measurement interval by extrapolating a set of utilization data within the resource data;

synchronizing at least one time stamp in the resource data;

converting at least one set of units in the plurality of resource utilization indicators to a set of consistent units;

aggregating a set of servers, from the plurality of servers, into a mega server;

gathering a set of network data from a functional trace test carried out by the collection of network sniffers;

deriving a transaction summary from the set of network data wherein the transaction summary comprises a tabular listing of the sequence of transactions for each business function in the set of business functions, the tabular listing including information related to resource usage within the plurality of servers;

deriving a set of web log data from the function load test;

calculating a number of business functions from the transaction summary;

calculating a resource consumption for the plurality of servers;

calculating a business function cost for the single business function by dividing the resource consumption by a measured number of executions of the single business function;

deriving a single business function profile for the single business function from the resource data, the business function cost for the single business function and the number of business functions in the set of business functions;

adopting a transaction flow from the transaction summary;

building a discrete event simulation model from the single business function profile and the transaction flow; and, performing a simulation of the production network with the discrete event simulation model in the discrete event simulation tool and producing a report displayed on the analysis computer which optimizes and scales the production network.

10. The system of claim 9 wherein the analysis computer is further programmed to carry out the step of calculating a resource consumption for the plurality of servers:

by multiplying the resource utilization during the reporting interval by the length of the reporting interval.

11. The system of claim 9 wherein the analysis computer is further programmed to carry out the step of:
   deriving a business function profile by dividing the resource consumption by the number of business functions.

12. The system of claim 9 wherein the analysis computer is further programmed to carry out the steps of:
   identifying a business function search entity from an HTTP map in the transaction summary; and
   searching a web log for the business function search entity within the step of calculating a number of business functions from the transaction summary.

13. The system of claim 12 wherein the business functions search entity is one of the group of text and regular expression.

14. The method of claim 13 wherein the step of creating a business function profile further comprises the step of identifying a visit count.

15. The method of claim 13 wherein the step of calculating a business function profile further comprises searching a web log with a search technique to locate the number of occurrences of the business function.

16. The method of claim 15 wherein the search technique is one of the group of pattern matching and text matching.

* * * * *

UNITED STATES PATENT AND TRADEMARK OFFICE
CERTIFICATE OF CORRECTION

| | | |
|---|---|---|
| PATENT NO. | : 7,818,150 B2 | Page 1 of 1 |
| APPLICATION NO. | : 11/374826 | |
| DATED | : October 19, 2010 | |
| INVENTOR(S) | : Paul T. Barnett et al. | |

It is certified that error appears in the above-identified patent and that said Letters Patent is hereby corrected as shown below:

column 20, line 4 (Claim 14): Delete the word "method" and replace with the word "system".
    column 20, line 7 (Claim 15): Delete the word "method" and replace with the word "system".
    column 20, line 11 (Claim 16): Delete the word "method" and replace with the word "system".

Signed and Sealed this
Thirty-first Day of May, 2011

David J. Kappos
*Director of the United States Patent and Trademark Office*